May 27, 1958   S. B. PICKLES ET AL   2,836,820
OMNIRANGE BEACON ANTENNA

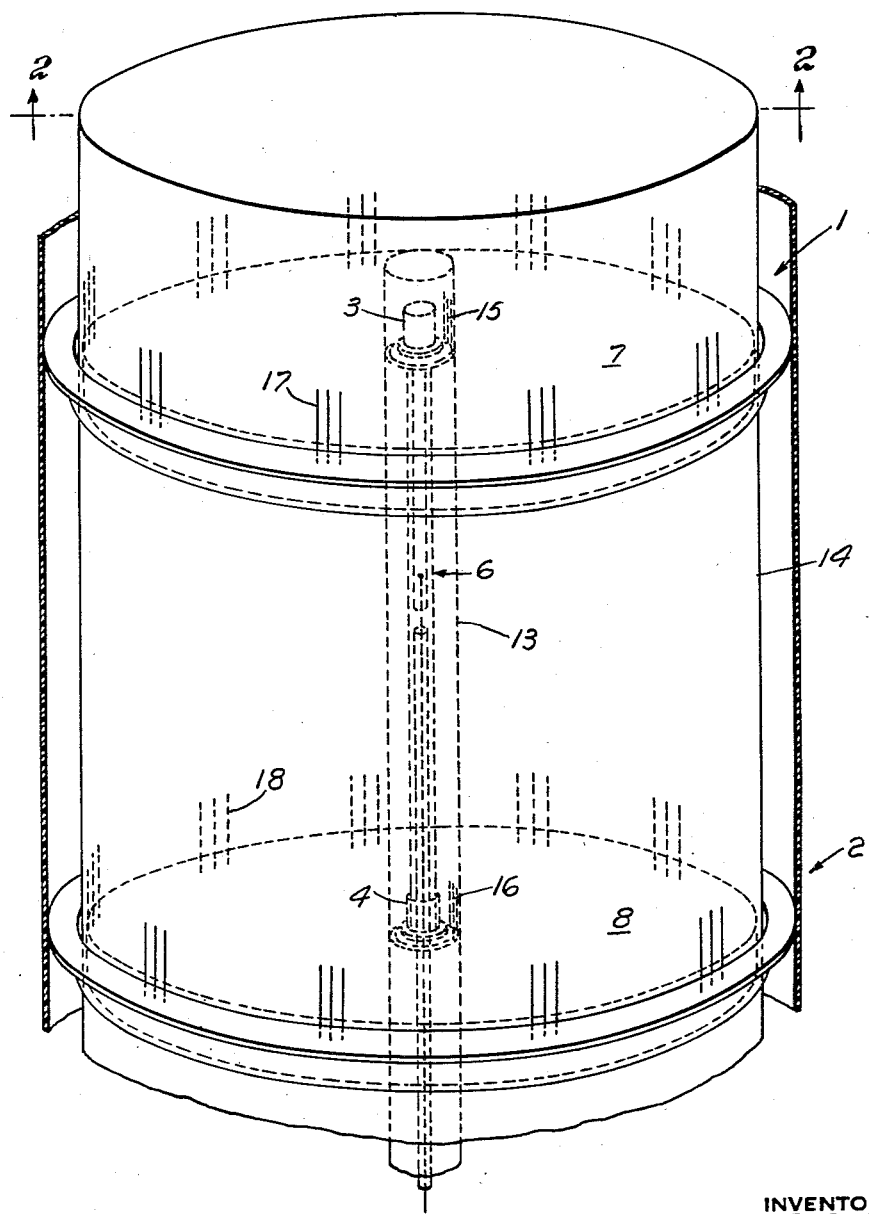

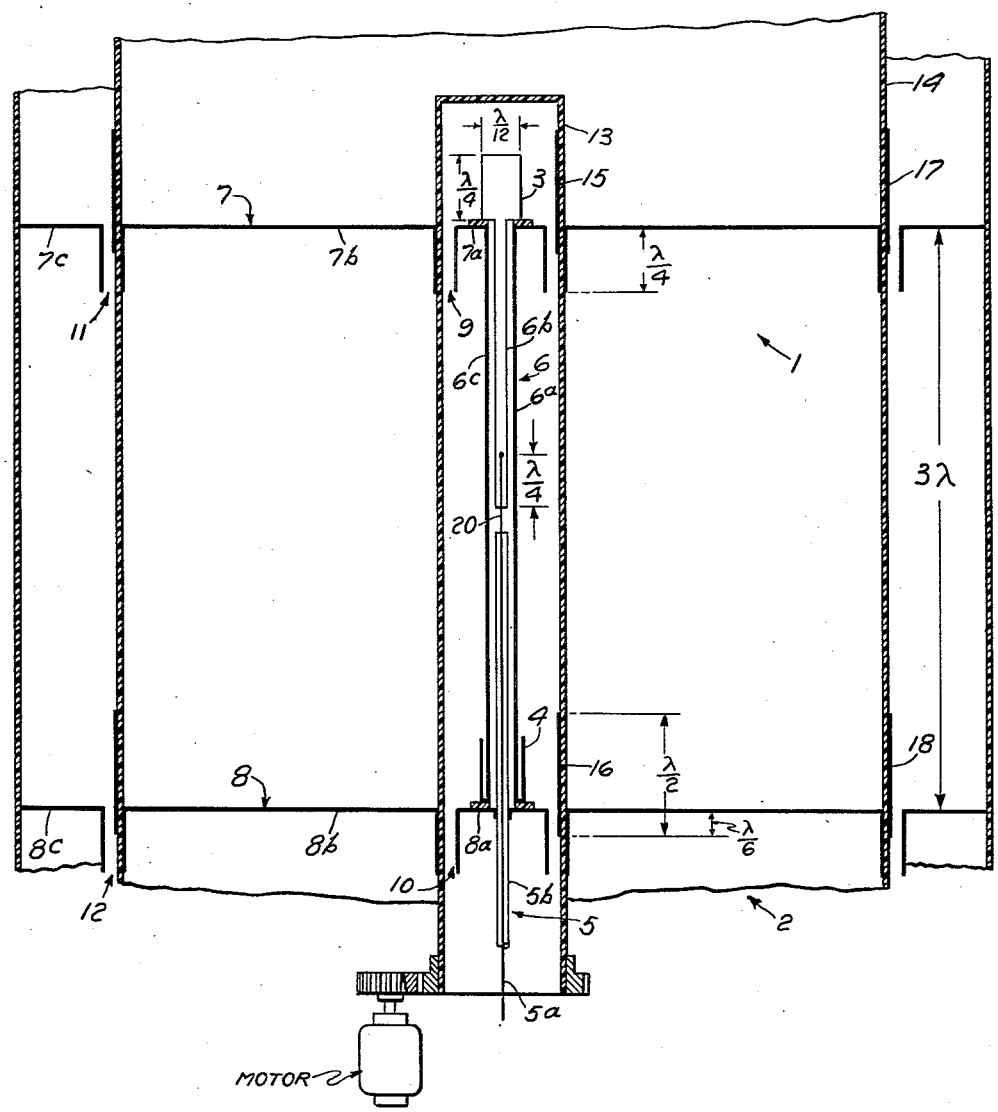

Filed Jan. 4, 1955   8 Sheets-Sheet 3

VERTICAL PATTERN OF TWO NON-DIRECTIONAL RADIATORS VERTICALLY DISPLACED

THEORETICAL VERTICAL PATTERN OF TWO ELEMENTS AS IN FIG. 1. FED ENERGY AS IN FIG. 3.

INVENTORS
SIDNEY B. PICKLES
PAUL R. ADAMS
CONSTANTINO LUCANERA
BY
ATTORNEY

May 27, 1958 S. B. PICKLES ET AL 2,836,820
OMNIRANGE BEACON ANTENNA
Filed Jan. 4, 1955 8 Sheets-Sheet 4
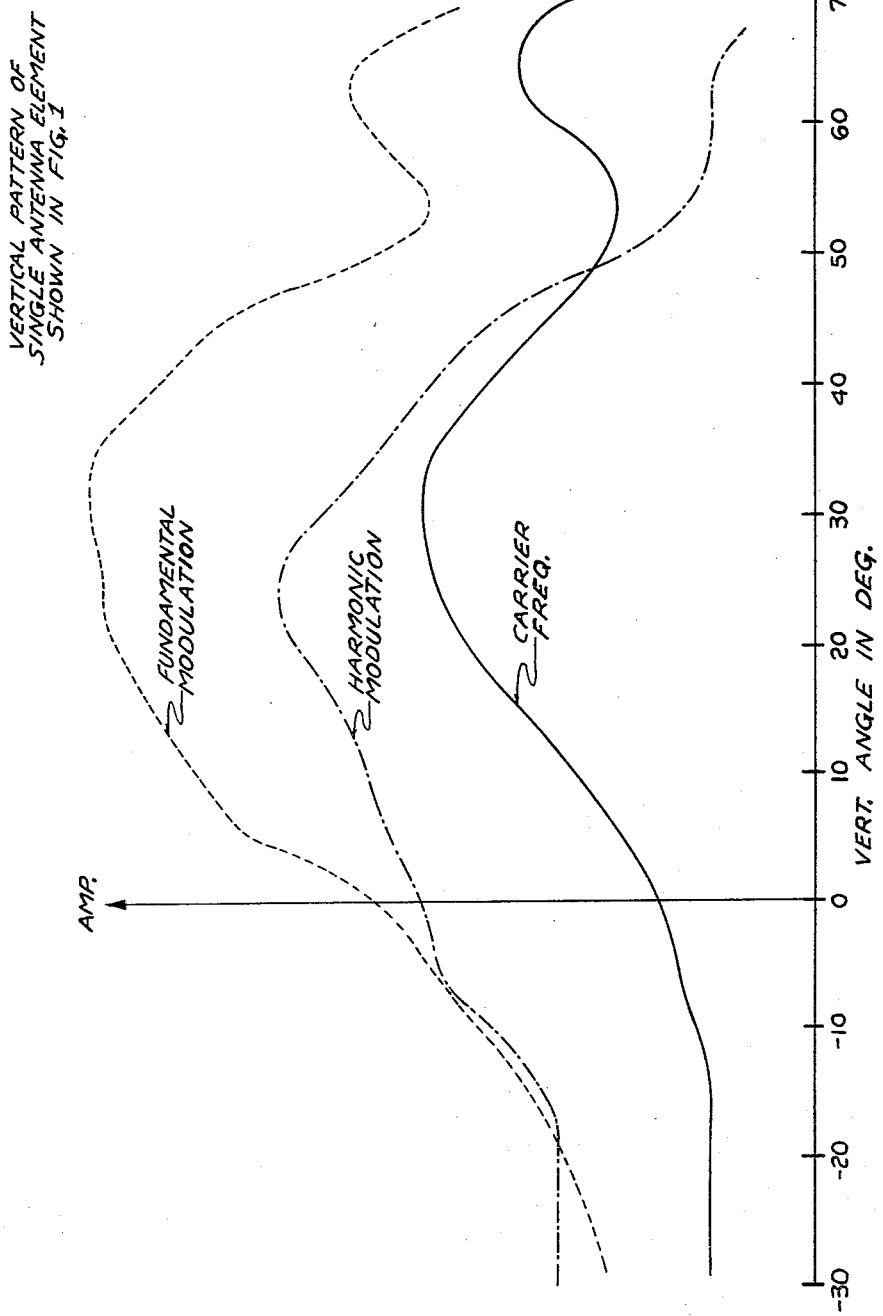

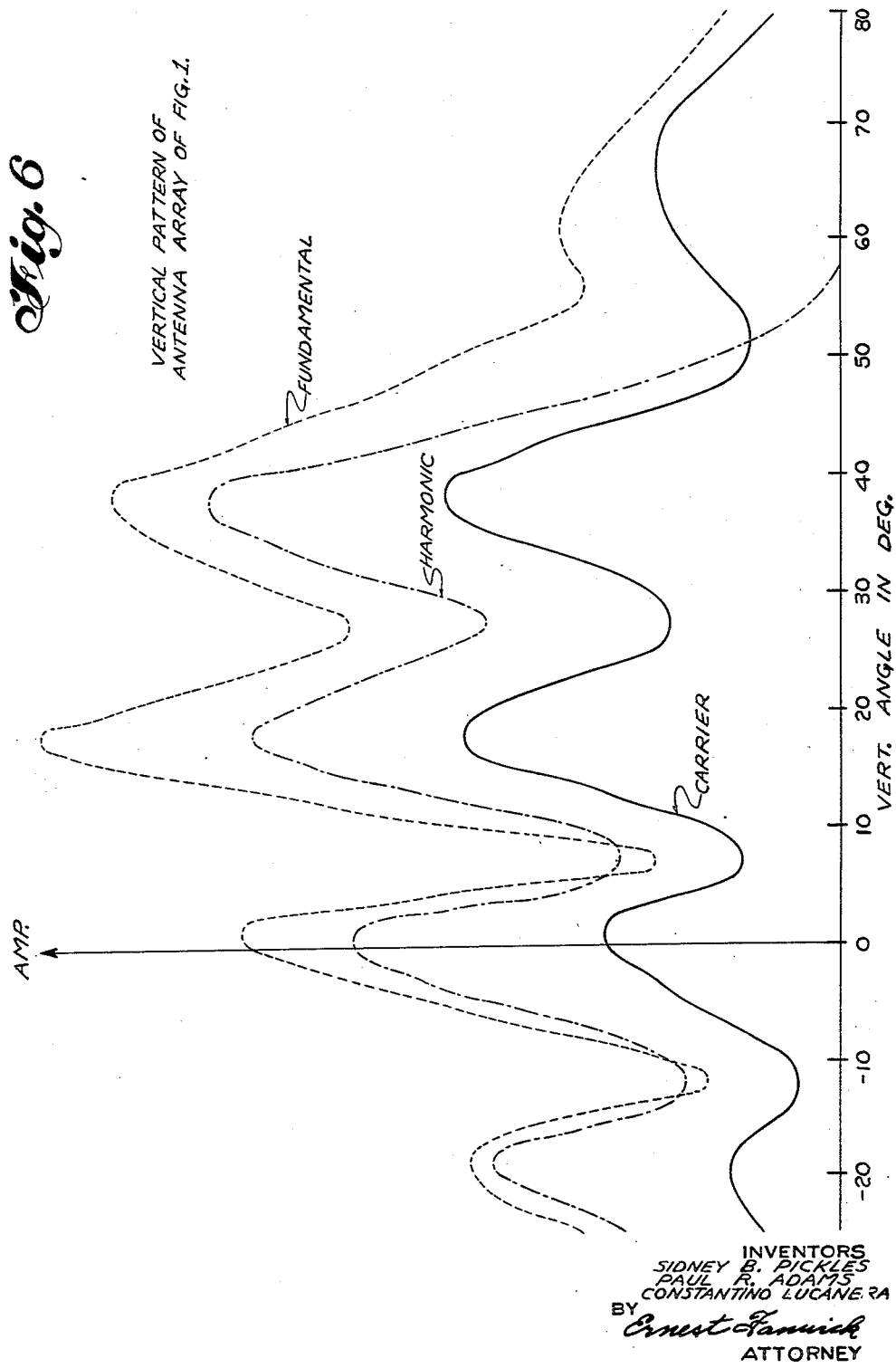

May 27, 1958 S. B. PICKLES ET AL 2,836,820
OMNIRANGE BEACON ANTENNA
Filed Jan. 4, 1955 8 Sheets-Sheet 6

INVENTORS
SIDNEY B. PICKLES
PAUL R. ADAMS
CONSTANTINO LUCANERA
BY
ATTORNEY

May 27, 1958  S. B. PICKLES ET AL  2,836,820
OMNIRANGE BEACON ANTENNA

Filed Jan. 4, 1955  8 Sheets-Sheet 7

INVENTORS
SIDNEY B. PICKLES
PAUL R. ADAMS
CONSTANTINO LUCANERA
BY Ernest Famwich
ATTORNEY

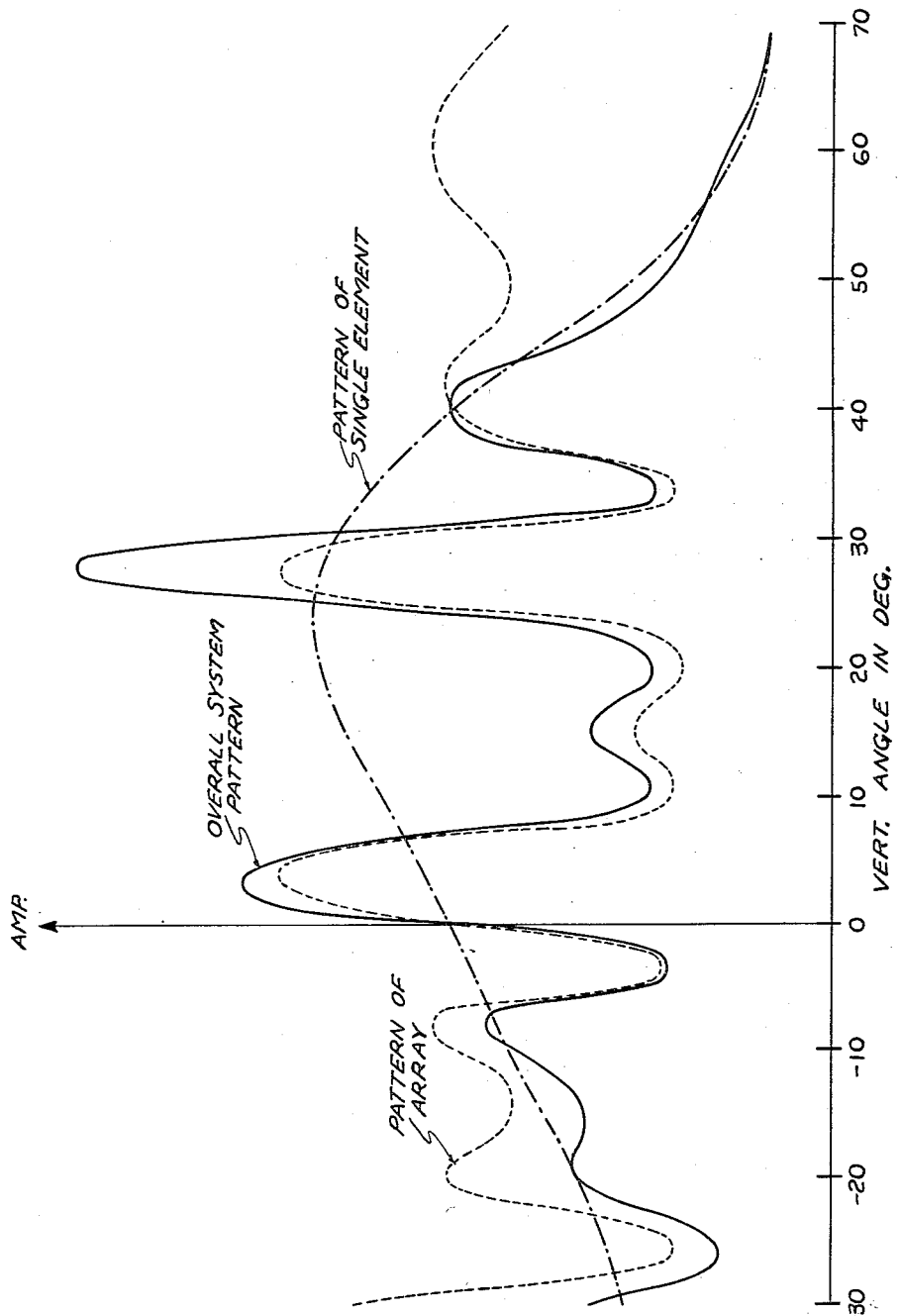

United States Patent Office 2,836,820
Patented May 27, 1958

2,836,820

OMNIRANGE BEACON ANTENNA

Sidney B. Pickles, Monterey, Calif., Paul R. Adams, Monclair, N. J., and Constantino Lucanera, White Plains, N. Y., assignors to International Telephone and Telegraph Corporation, Nutley, N. J., a corporation of Maryland Application January 4, 1955, Serial No. 479,816

6 Claims. (Cl. 343—839)

This invention relates to omnirange beacon antennas and more particularly to directive antenna systems for producing a multiple modulation radiation pattern having a fundamental modulation frequency and one or more additional harmonics of the fundamental modulation frequency for use with omnidirectional beacons designed to have a relatively high vertical coverage.

Omnidirectional beacon systems are known having a high order of directional accuracy which are dependent upon the use of a directive antenna pattern rotated at a fundamental frequency and modulated by a harmonic of this fundamental frequency so as to produce a generally multilobed rotating directive radiation pattern. Due to the rotation of the multiple modulation antenna pattern, a receiver loacted remotely from the transmitter receives energy which appears as an amplitude modulated wave having a fundamental modulation component and a modulation component at a harmonic frequency of the fundamental. Both fundamental and harmonic frequency reference signals are transmitted omnidirectionally for comparison with the received components of the rotating pattern so that the receiver may determine its azimuth relative to the beacon's antenna system.

Previous antennas designed for use with such omnidirectional beacons have necessitated the use of rotating radio-frequency (R-F) joints and usually have been difficult to enclose for protection from the weather. Other antenna systems known to the prior art have disclosed the production of the modulation frequency by the rotation of a parasitic element about a vertical stack of central radiators such as cones. A long straight wire used as a parasitic element associated with and excited by a vertical stack of centrally located radiators is excited in a substantially uncontrollable manner. Dissymmetry in the excitation of the parasites by the vertical stack of radiators results in a shift of antenna pattern lobe structure as a function of vertical angle. It has been found that such prior art antenna systems have a radiation pattern in which the modulation phase does not stay fixed as a function of vertical angle thus introducing large errors in the information extracted from the beacon transmission.

One of the objects of this invention, therefore, is to provide an improved omnidirectional beacon antenna system especially suited for use in the radiation of a rotating multilobed directive radiation pattern having a substantially constant modulation phase as a function of the vertical angle.

Another object of this invention is to provide an antenna system for producing a multilobed azimuthal directive pattern which may be completely enclosed so as not to be affected by weather elements and without utilizing rotating radio-frequency joints.

A further object of this invention is to produce an antenna system for radiating a multilobed rotating directive radiation pattern utilizing two independent antenna units vertically spaced a relatively great distance apart each to excite its own associated parasitic elements.

In accordance with one of the features of this invention, our antenna system array comprises a plurality of independent antenna units vertically spaced from each other with each unit including a central radiator disposed above a counterpoise surface forming a support structure for the parasitic modulation elements disposed for rotation about each of the radiators. The energy from the radiators are modulated by the rotating parasitic elements disposed at at least two different distances from their associated radiator to provide a multilobed radiation pattern having a fundamental and harmonic frequency modulation for use in an omnidirectional beacon system. The antenna system array is fed by a coaxial line having an inner conductor which is not conductively coupled to the radiator thereby eliminating the need for conductive joints and thus increasing the continuity of service.

The above-mentioned and other features and objects of this invention will become more apparent by reference to the following description taken in conjunction with the accompanying drawings, in which:

Fig. 1 is a perspective view of one embodiment of the omnidirectional beacon system of this invention utilizing a pair of radiating units;

Fig. 2 is a sectional view of the antenna system taken along lines 2—2 of Fig. 1 and illustrating the arrangement of the center radiator unit and feed system;

Figure 7:
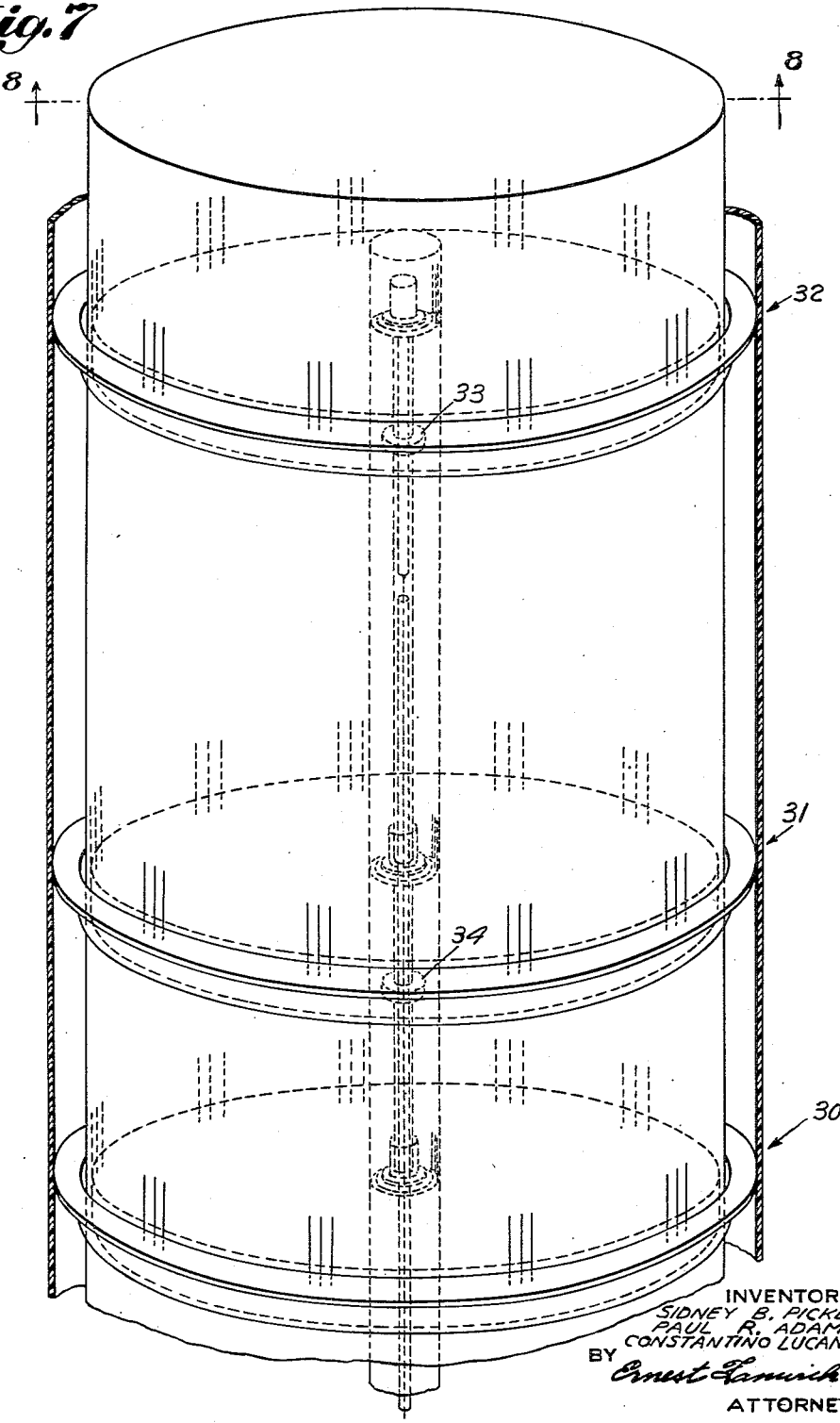
Figure 8:
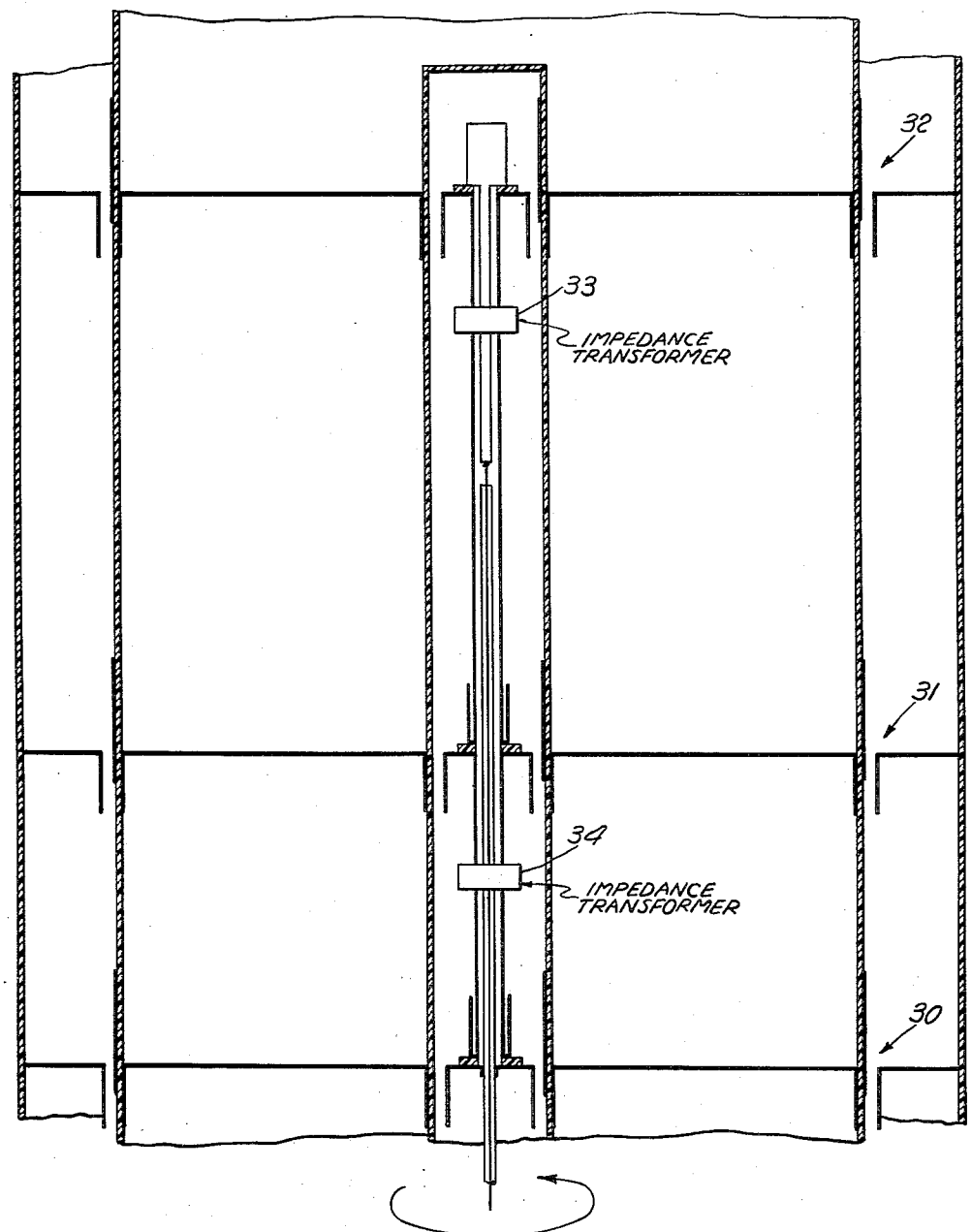

Figs. 3 through 6 inclusive are graphs illustrating various radiation patterns helpful in explanation of the antenna system of this invention;

Fig. 7 is a perspective view of one embodiment of the omnidirectional beacon system of this invention utilizing three radiating units;

Fig. 8 is a sectional view of the antenna system shown in Fig. 7 taken along the lines 8—8 of Fig. 7; and Fig. 9 is a graph of the vertical radiation pattern of the antenna array shown in Fig. 7.

Referring to Figs. 1 and 2 of the drawing, one embodiment of an antenna system in accordance with the principles of this invention for producing a rotating multilobed directive radiation pattern is shown to comprise essentially an upper and lower antenna unit 1 and 2 respectively. Each antenna unit 1 and 2 respectively comprises a central radiator 3 and 4 to which radio-frequency energy is coupled through coaxial transmission line 5 and feed system 6. A plurality of metal disks 7 and 8 functioning as counterpoises are associated with the radiating elements 3 and 4. Each disk 7 and 8 comprises as shown in Fig. 2 a central area 7a and 8a, a middle area 7b and 8b and an outer flange area 7c and 8c. The adjacent edges of the areas, forming the disks 7 and 8, are flanged to provide radio-frequency choke joints 9 and 10 and 11 and 12. Surrounding the central radiator assemblies 3 and 4 and extending through the choke joints 9 and 10 is an inner cylindrical housing 13 formed of a dielectric material, such as fiberglass. Surrounding the assemblies and extending through the radio-frequency choke joints 11 and 12 is an outer cylindrical housing 14 composed of a dielectric material such as fiberglass. A plurality of groups of parasitic elements 15 and 16 for fundamental frequency modulation are carried by the inner cylinder housing 13 and each group is associated with the radiators 3 and 4 respectively and disposed for rotation thereabout. The parasitic elements 15 extend partly below the counterpoises 7 and 8 and are insulated therefrom. A plurality of groups of parasitic elements 17 and 18 for harmonic frequency modulation are associated with each of the radiators 3 and 4 and are carried by the outer fiberglass housing 14. The fiberglass housings 13 and 14 are each supported by the middle area 7b and 8b of the counterpoise surfaces 7 and 8.

In order to produce the rotating multilobed directional radiation pattern, it is merely necessary to rotate the middle areas of the surfaces 7 and 8, thereby rotating cylinders 13 and 14 and both the fundamental and harmonic frequency parasitic elements 15, 16, 17 and 18. Outer areas 7c and 8c are provided as an extension of the counterpoise surfaces which surround the rotating portion of the antenna system and choke joints 11 and 12 are utilized to prevent the rotation of an unwieldy physical system. The choke joints 9 and 10 are provided at the center of the counterpoises 7 and 8 so that there is no need for a rotating R.-F. joint in the coaxial feed system, thus allowing the central radiators 3 and 4 to remain stationary while the disk assembly is rotated. When the various antenna units 1 and 2 are stacked vertically one above the other each central radiator 3 and 4 excites only the parasitic elements associated therewith. It is necessary that the elements 1 and 2 be spaced sufficiently far apart to prevent the under side of the next higher antenna unit from interfering appreciably with the radiation of the radiating antenna unit directly below. We have found that a separation substantially less than that of the diameter of the disks is quite adequate.

The antenna radiators 3 and 4 are fed from an R.-F. source (not shown) through coaxial transmission line 5 and feed system 6. The outer conductor 5b is coupled to the counterpoise 8. The inner conductor 5a of the main transmission line 5 is not conductively coupled to an antenna radiator, but extends to a point approximately midway between the two antenna units 1 and 2 where the inner shield 6b which is an extension of the outer conductor 5b is broken as indicated by the gap 20. The inner conductor 5a extends approximately a quarter wavelength into the upper section 6a of the parted inner shield 5b resulting in an inductive coupling of the energy from inner conductor 5a to the inner shield 6b. The shield 6b then functions as an inner conductor coupling R.-F. energy to the upper radiating element 3 while the outer shield 6c is connected to the counterpoise ground plane 7 and to the lower radiating element 4. The outer shield 6c completes the unbalanced transmission line feed system.

It is well known to those familiar with the antenna art that two non-directional radiators disposed one above the other and fed unequal current amplitudes and having a dissymmetrical phasing will produce a vertical radiation pattern similar to that shown in Fig. 3. The phasing of the energy radiated by the two radiators alternately reinforces and cancels causing the lobes and nulls apparent in Fig. 3. It is, of course, highly desirable for beacon system radiation patterns to have a sharply differentiated radiation intensity between the signal directed above the horizon (0° elevation) and that directed below the horizon since energy directed below the horizon serves no useful purposes and causes siting errors in the beacon system.

Figure 4:
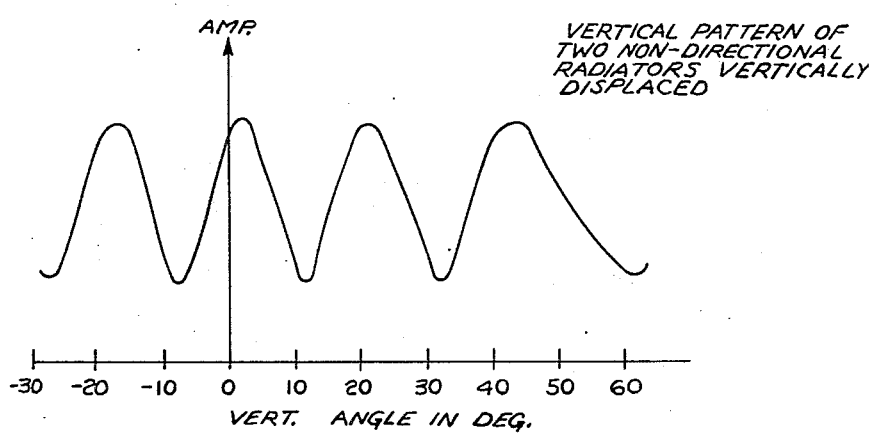
Figure 5:
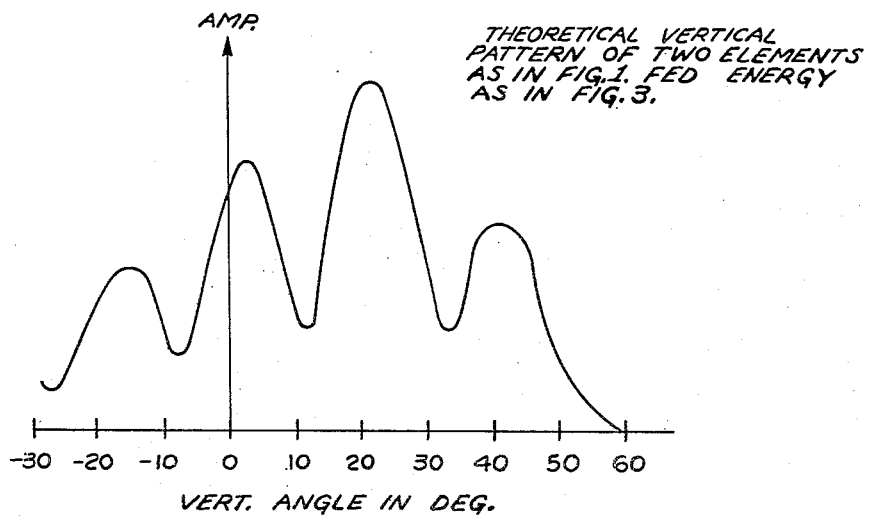

Referring to Fig. 4, the vertical radiation pattern for a single element of the antenna array of Fig. 1 shows that the signal intensity directed below the 0° elevation angle or horizon compared to the radiation pattern of the combination of two non-directional radiators show in Fig. 3, decreases more rapidly until appreciable angles beyond the horizon are reached. It is the intensity characteristics in the immediate vicinity of the horizon that are most critical. A decrease in the intensity of signals at greater angles both above and below the horizon, is accomplished by utilizing the radiators shown in Fig. 1. Such radiators have appreciable vertical directivity such that at angles below the horizon the signal is considerably less than at angles above the horizon as shown in Fig. 4. When this characteristic is combined with the pattern shown in Fig. 3, that is when two such radiators are vertically disposed one above the other and fed unequal current amplitude with dissymmetric phasing the over-all radiation pattern is such as is shown in Fig. 5.

Fig. 6 shows a measured radiation pattern of the combination of a double stack of antenna elements described above and modulated in a manner shown by the antenna system of Figs. 1 and 2. It is apparent that there is a marked similarity between the radiation pattern shown in Fig. 5 and that shown in Fig. 6. The most critical portion of the vertical radiation pattern is in the vicinity of the horizon where the slope of the curve shown in Fig. 6 is very sharp.

It is, of course, not essential that such antenna systems consist entirely of only two groups of vertical radiators. Referring to Figs. 7 and 8, an antenna system in accordance with the principles of this invention is shown comprising three vertical antenna units 30, 31 and 32 each similar to that shown for Figs. 1 and 2. It is to be noted that the feed system for the antenna shown in Figs. 7 and 8 includes impedance transformers 33 and 34 which are utilized to adjust for proper phasing and impedance match between the upper and lower units. The lower element may be spaced at one half the distance of the spacing between the upper two antenna elements for satisfactory operation.

Referring to Fig. 9, the vertical pattern of the antenna radiation in the system shown in Figs. 7 and 8 is seen to have a very sharp slope at the horizon crossover point. The antenna pattern of Fig. 9 is quite useful not only in overcoming siting difficulties on shore, but likewise in decreasing interference effects which are encountered when a beacon is located over sea water. Higher frequencies encounter good reflecting surfaces on sea water resulting in a well defined vertical lobe structure and unless a sharp antenna radiation pattern similar to that shown in Fig. 9 is used over sea water, the depth of the nulls at angles close to the horizon may result in alternate regions of good and poor signal strength as a receiver approaches the transmitting antenna. Of course, a feed system similar to the system shown for the antenna of Figs. 1 and 2 may be incorporated in the three-element radiating system, thereby allowing the whole system to be slipped together mechanically in a system of telescopic joints.

While we have described above the principles of our invention in connection with specific apparatus, it is to be clearly understood that this description is made only by way of example and not as a limitation to the scope of our invention as set forth in the objects thereof and in the accompanying claims.

We claim:

1. An antenna system comprising means presenting a plurality of conductive surfaces vertically spaced from each other, a plurality of radiators each associated with one of said surfaces and vertically disposed axially in the center of such surface and at least one parasitic element associated with each of said radiators and disposed for rotation about said radiator.

2. An antenna system comprising means presenting a plurality of parallel conductive surfaces vertically spaced from each other, a plurality of radiators each associated with one of said surfaces and vertically disposed axially in the center of the associated surface, a first group of parasitic elements at a given distance from the axial alignment of said radiators, at least one of said elements being associated with each of said radiators and disposed for rotation about said radiator and a second group of parasitic elements with at least one of the elements thereof associated with each of said radiators at a distance greater than said given distance from said center and disposed for rotation about said radiator.

3. An antenna system comprising means presenting a plurality of parallel planar conductive surfaces vertically spaced from each other, a plurality of radiators vertically disposed in axial alignment centrally of such surfaces, each of said radiators being associated with one of said surfaces, a dielectric cylinder surrounding said surfaces, a plurality of parasitic elements carried by said cylinder, at least one of said elements being associated with each of said radiators and means to rotate said parasitic elements about said radiators.

4. An antenna system comprising means presenting a plurality of parallel counterpoise surfaces, each surface including an inner, a middle and outer area, said means having their adjacent edges flanged to provide radio-frequency chokes, a plurality of radiators vertically disposed in axial alignment centrally of said inner areas, each of said radiators being associated with one of said surfaces, a first dielectric cylinder connected to the inner edges of the middle areas of said surfaces, a second dielectric cylinder connected to the outer edges of said middle areas of said surfaces, a first group of parisitic elements having at least one of said elements being associated with each of said radiators and carried by said first dielectric cylinder, a second group of parasitic elements having at least one of said elements being associated with each of said radiators and carried by said second dielectric cylinder and means to cause said dielectric cylinders to rotate.

5. An antenna system comprising a plurality of independent radiating units vertically disposed one above the other and each of said radiator units comprising means presenting a conductive surface, a radiator vertically disposed centrally of said surface and a plurality of parasitic elements disposed for rotation about said radiator.

6. An antenna and associated feed system for coupling radio-frequency energy to said antenna, said antenna including at least two independent radiating units vertically disposed one above the other, said feed systems comprising a coaxial cable having an inner and outer conductor, said outer conductor being terminated at a point substantially midway between said vertically disposed radiating units, a first conductor commencing at a predetermined distance from said outer conductor termination and coupled to the upper of said radiators, said inner conductor terminating substantially one-quarter wavelength above the start of said first conductor, a second conductor surrounding said first conductor and terminating a predetermined distance from said upper radiator and coupled to said lower radiator.

References Cited in the file of this patent

UNITED STATES PATENTS

| | | |
|---|---|---|
| 2,568,718 | Chambers | Sept. 25, 1951 |
| 2,611,870 | Clavier | Sept. 23, 1952 |
| 2,677,110 | Amy | Apr. 27, 1954 |
| 2,677,766 | Litchford | May 4, 1954 |